Patented Feb. 15, 1949

2,461,918

UNITED STATES PATENT OFFICE 2,461,918

POLYAMINE RESINOUS COMPOSITION AND AN INK MADE THEREFROM

Frederick Edward Petke, Cincinnati, Ohio, assignor to Sterling Drug Inc., New York, N. Y., a corporation of Delaware No Drawing. Application August 14, 1945, Serial No. 610,879

16 Claims. (Cl. 106—30)

This invention relates to coating and printing compositions containing resinous materials, and more particularly to compositions containing polyamine salts of acidic resins. These compositions are adapted for use in coatings and are of special value in the formulation of printing inks, although the invention is not limited to such uses.

It has been proposed heretofore to employ various acidic resinous substances in coating or in printing ink compositions and some of these have achieved a measure of commercial success. The value of these compositions, however, is limited by their inherent defects. The acidic character of the resins tends to make them corrosive and thus they cannot be applied to surfaces which may be corroded thereby. When used in printing ink vehicles, it is difficult to disperse pigments therein, and the acidic constituents tend to decompose or otherwise destroy some of the pigment materials commonly used in ordinary printing ink. Many of these compositions also tend to thicken and become "heavy" in body and eventually even to coagulate into heavy liver-like masses.

Several proposals have been made in the effort to mitigate these conditions. For example, in the case of printing inks, it has been proposed that the pigment particles be coated with a neutral protecting resin which insulates the pigment itself from the corrosive action of the acid groups in the resin vehicle. This is expensive, and it tends to markedly alter the viscosity, tone and other characteristics of the resulting ink composition. In general, the proposals made heretofore for reducing the acidic character of the resin altered its solubility, viscosity or drying characteristics to such an extent as to render it undesirable for coating or printing ink usage.

Surprisingly enough, it has now been found that the foregoing objections can be overcome by the presence of salts of the acidic resin and certain polyamine substances. These salt resin compositions have improved pigment wetting properties, better viscous stability and may be so compounded as to have better solubility characteristics than the acidic resin compositions.

The objects as achieved by the present invention include the provision of an acidic resin salt composition adapted for coating purposes; the provision of an acidic resin salt printing ink composition containing the usual pigments and having no corrosive action on said pigments; the provision of ink vehicles having improved pigment wetting properties; the provision of printing inks of high viscous stability; and other objects as will be apparent as the invention is more fully developed hereinafter.

In accordance with the invention, an acidic resin is treated with a polyamine and the resulting resinous composition contains a polyamine salt of the acidic resin. The resin and the polyamine may be so selected that the resulting salt resin will have desired solubility characteristics in solvents such as those usually used in ink formulations. The resulting salt resin has a much superior pigment wetting power than the original acidic resin. The polyamine salt resin compositions have excellent drying characteristics, and at the same time their viscous stability is also very high; that is, they do not tend to "heavy up" or "liver" in body and thus are markedly superior to the heretofore proposed acidic resinous coating or printing ink vehicle compositions.

A wide range of acidic resins may be used in preparing the polyamine salt resins. One type is the adduct obtained by reacting rosin with an olefin dicarboxylic acid or derivative thereof. These include the rosin-maleic anhydride, rosin-maleic diester, and the rosin-maleic acid adducts; and also the rosin-fumaric diester and rosin-fumaric acid adducts. Another type is the adduct of terpene and an olefin dicarboxylic acid or derivative thereof. These may be prepared from a variety of terpenes and, for instance, either the maleic or fumaric acids or derivatives by the so-called diene syntheses. Various alkyd resins having free acidic groups may be employed. These resins may be obtained by reacting a poly basic acid or anhydride with a higher polyhydric compound; for instance, by the reaction of phthalic anhydride with glycerol. Substantially neutral resinous materials which can be modified by reaction with an olefin carboxylic acid anhydride may be used. The modification results in a product having carboxy groups.

The polyamines of the ethylene diamine series have been found to be eminently suitable. This series includes ethylene diamine, diethylene triamine, triethylene tetramine, etc. Even the higher members of this series are suitable; for instance, members containing 40 or more ethylene groups work satisfactorily. The substitution derivatives of the polyethylene polyamines have also been found to be suitable. One of these has each amino hydrogen thereof replaced by an ethanol group. Another has each amino hydrogen replaced by an ethyl group. Another has either one or both of the terminal $NH_2$ groups replaced by a morpholine ring. Other polyamines that may be used include urea and polyurea, melamine, or other amino-triazine derivatives, and the fully substituted amines including quarternary ammonium ion compounds.

The polyamine acidic resin salt is substantially amide-free and may be formed by dissolving the resin in a solvent and then adding the polyamine; or alternatively, the amine may be dissolved in the solvent and then the resin added. In some cases, the solvent may be dispensed with and the polyamine reacted directly with the acidic resin. The amount of polyamine used is sufficient to form a salt with at least some of the acid groups in the resin, but in many cases the amount used is not enough to neutralize all the acid groups in the acidic resin.

In formulating ink of the polyamine acidic resin salt type, the pigment may be ground, or merely mixed or flushed, in the solution of the salt in the solvent in which the salt is prepared, or by first forming the salt and then dissolving it in the solvent. The pigment may be incorporated into an acidic resin by the usual grinding procedure and then the polyamine added thereto; inks formulated with acidic resins may be improved or stabilized in accordance with the invention by adding the polyamine thereto.

In general, the lower molecular weight polyamines tend to impart a higher pH increase per given weight of nitrogen and a smaller increase in tack and viscosity than do the higher molecular weight amines. The polyethylene polyamine salts have a lower water tolerance and their drying time is higher than that of the corresponding acidic resins which are used in steam-set inks. The salts of the polyethylene polyamine derivatives having all the amino hydrogens replaced by ethanol groups have a higher water tolerance than the corresponding acidic resin used in steam-set inks and their drying time is lower. The viscosity and tack of this resin are lower than those of the corresponding polyethylene polyamine resin.

By using a mixture of completely substituted polyethylene polyamine and non-substituted polyethylene polyamine, it is possible to produce polyamine resin having a desired viscosity, tack, and in the case of steam-set inks, water tolerance characteristics. A similar effect can be achieved by using partially substituted polyethylene polyamines having different substituents.

All of these polyamine acid resin salts have excellent pigment wetting properties. The polyamine salt of a moisture setting ink has excellent moisture wetting properties. Steam or a mist of water may be used.

For use in coating compositions, the polyamine salt of the acidic resin should have molecular weight or solubility characteristics such that it is soluble in the usual ink varnish solvents, such as the poly glycols or drying oils, and other solvents such as used in rotogravure or heat-set inks.

The improved pigment wetting, body and flow, strength of film, tone, and the like characteristics may be obtained in any type acidic resin containing coating or printing ink in accordance with the invention. These include: drying oil type inks and varnishes modified with polybasic acid resins; rotogravure type varnishes and inks containing a solution of a polybasic acid in a solvent; heat set type inks and varnishes which are acidic (neutral resins are preferably made acidic by reaction with an olefin polycarboxylic anhydride and then treated in accordance with the invention).

In order to illustrate and point out some of the advantages of the invention, but in no sense as a limitation thereof as otherwise disclosed herein, the following specific examples are included.

*Example 1*

500 grams of a commercial acidic resin sold under the trade name "Teglac 127", the preparation of which is described in U. S. Patent No. 2,063,542 by a reaction of glycerol, rosin and a fumaric or maleic acid or derivative thereof, was dissolved in 750 grams of toluol. 20 grams of tetraethylene pentamine was added. A small amount of precipitate formed. The whole reaction mass was freed of solvent by drying in a vacuum oven. The resulting solid was pulverized and 200 grams dissolved in 300 grams of diethylene glycol. The resulting varnish had a higher viscosity than a corresponding composition containing no polyamine.

*Example 2*

20 grams of commercial dry calcium lithol was ground in 80 grams of polyamine varnish composition of Example 1 on a conventional three roller mill. The pigment was thoroughly wetted and the milled composition possessed good body and good flowing characteristics.

In a corresponding run using 20 grams of the same dry color and a corresponding amount of the corresponding polyamine free varnish as discussed in Example 1, the body and flow characteristics of the product obtained were poorer than the above polyamine salt product.

*Example 3*

50 parts by weight of a commercial acidic resin sold under the trade name "Teglac 127" (described in Example 1) was dissolved in 50 parts by weight of hexaethylene glycol

and then 30 parts by weight of commercial iron blue pigment was milled, i. e., mixed therein. To a 100-gram sample of the resulting composition, 2 grams of triethylene tetramine was added. The resulting polyamine salt composition had better flow and body, and viscous stability characteristics than did a corresponding polyamine free sample.

*Example 4*

500 parts by weight of a commercial acidic resin sold under the trade name "Teglac 127" (described in Example 1) was dissolved in 500 parts by weight of the acetate of the monobutyl ether of diethylene glycol, and 10 parts by weight of tetraethylene pentamine was dissolved therein. In 850 parts by weight of the resulting varnish was flushed 2075 parts by weight of an aqueous suspension of a commercial highly resinated calcium lithol containing 19.2% by weight solids. The mixture was allowed to stand, and an upper water layer formed. This water was decanted from the pasty lower layer. The moist paste was vacuum dried. The dried paste was mixed with 296 parts by weight of diethylene glycol and 4 parts by weight of tetraethylene pentamine. The resulting product possessed good body and flow characteristics, and a clear and transparent print tone and mass tone,

Example 5

296 parts by weight of phthalic anhydride, 106 parts by weight of diethylene glycol and 62 parts by weight of glycol were mixed and heated at 185° C., until the reaction mass attained an acid number of 110. 50 parts by weight of the resulting resin was dissolved in 50 parts by weight of diethylene glycol, and then 4 parts by weight of ethylene diamine was dissolved therein. Several inks made by grinding usual pigments in this varnish and adding usual diluents showed better body, flow and viscous stability characteristics than the corresponding polyamine free inks which were otherwise similarly made.

Example 6

71.5 parts by weight of triethanol amine and 1500 parts by weight of ethylene glycol were mixed and heated to 50° C., then 747.5 parts by weight of refined shellac was added thereto with agitation, while the temperature was maintained at between 50° and 60° C. Then 373 parts of diethylene glycol mono ethyl ether (Carbitol) was added, followed by 165.75 parts by weight of triethanol amine, and finally 214.5 parts by weight of water was added. In 80 parts by weight of the shellac solution, was ground 20 parts by weight of commercial calcium lithol pigment (the calcium salt of the reaction product of diazotized 2-naphthylamine-1-sulfonic acid and betanaphthol), using a three roller mill. After dispersion was complete, 5 parts by weight of urea was added and dispersed therein. The printing ink obtained therefrom, by adding usual diluents, showed better body, flow and viscous stability characteristics than corresponding urea-free inks which were otherwise similarly made.

Example 7

50 parts by weight of an acidic resin prepared by reacting one or more terpenes with maleic or fumaric acid or derivatives thereof, in stoichiometric proportions, and having a softening point of 40°–50° C. and an acid number of about 530, is dissolved in 40 parts by weight of diethylene glycol; and then 2 parts by weight of hexamethylene diamine is added and dissolved therein. Several printing inks made by grinding usual pigments in this vehicle, and diluting with usual solvents, show better pigment wetting, body and flow characteristics than corresponding polyamine-free inks which are otherwise similarly made.

Example 8

747.5 parts by weight of shellac, 373 parts by weight of carbitol, 236 parts by weight of triethanolamine, and 200 parts by weight of water were mixed; a solution resulted. In 100 parts by weight of this varnish was dissolved 6 parts by weight of commercial hepta-ethanol-tetra-ethylene-pentamine; the pure material may be written as $(HOC_2H_4)_2N(C_2H_4NC_2H_4OH)_4C_2H_4OH$ Several printing inks were prepared by grinding usual dry colors in this vehicle and adding the usual diluents. Each of these showed better body and flow characteristics than corresponding polyamine-free inks which were otherwise similarly made.

Example 9

50 parts by weight of a commercial acidic resin sold under the trade name "Teglac 127" (described in Example 1) was dissolved in 50 parts by weight of diethylene glycol; and 2 parts by weight of hepta-ethanol-tetra-ethylene-pentamine was added and dissolved therein. This varnish was applied to sheets of unsized paper. Other sheets were coated with a corresponding polyamine free varnish. The polyamine salt vehicle showed less penetration into the sheet. When used in ink formulations the polyamine salt varnishes showed much better pigment wetting characteristics than did the polyamine-free varnishes.

The compositions of Example 1 through 9 are suitable for moisture or steam-set printing ink purposes. They all showed sufficient moisture tolerance to give good press life in the standard printing press rooms under the various humidity conditions thereof.

Example 10

92 parts by weight of a terpene resin modified type phenolic resin this having the following physical properties:

| | |
|---|---|
| Melting point | 138°–140° C. or 280°–284° F. (Capillary tube method) |
| Color | WW-N rosin scale |
| Acid number | 50–60 |
| Refractive index at 25° C. | 1.608 |
| Specific gravity at 25° C. | 1.085 |
| Weight per gallon | 9.04 lbs. |
| Bulking | 1 lb. bulks .11062 gal. |

414 parts by weight of high melting point ester gum, 312 parts by weight of a rosin modified type phenolic resin, this resin having the following properties:

| | |
|---|---|
| Physical state | Solid |
| Sp. gr. | 1.10 |
| M. P. °C. | |
| Acid No. | 142–149 |
| | 12–18 | and 2208 parts by weight of stand oil were mixed and heated to 200° C., with agitation; 37 parts by weight of lead acetate and 37 parts by weight of cobalt acetate were added, and the reaction mass was heated to 270° C., with agitation. 55 parts by weight of HMP ceresine wax (a commercial mineral wax melting in the range 150°–170° C.) was added and mixed therein. The reaction mass was cooled to 100° C. 34 parts by weight of tetraethylene pentamine was added and mixed therein.

The resulting product was an excellent gloss type drying oil varnish. Several printing inks were made by grinding dry pigments therein and diluting with a usual printing ink solvent. These were printed on paper, according to usual procedures. The inks set quickly, and dried to high gloss finished products.

Example 11

567 parts by weight of a partial glyceride of the adduct of rosin and maleic anhydride, obtainable by reacting the acidic resin described in Example 7 with sufficient glycerol to give a reaction product, having an acid number of 34, 283 parts by weight of a mineral oil fraction boiling in the range 265° to 300° C., and 8.5 parts by weight of commercial hepta-ethyl-tetra-ethylene-pentamine (the pure material may be written as ) were mixed. The resulting product was an excellent vehicle for heat set types of printing ink.

Several printing inks were prepared by grinding usual dry colors therein. Each of these showed much better body, flow and pigment wetting characteristics than corresponding polyamine-free inks which were otherwise similarly made.

Example 12

183 grams of polymerized wood rosin, 83 grams of dehydrated castor oil and 1450 grams of stand oil were mixed, and then heated with agitation at 290° C. until the viscosity of the reaction mass was approximately 20 poises at 25° C.; then the reaction was checked by the addition of 534 g. of the rosin. It was cooled to 100° C., and 22 grams of tetra-ethylene-pentamine was mixed therein.

Several inks were prepared by grinding usual dry colors therein and diluting with the usual diluents. Each of these non-gloss inks showed better body, flow, pigment wetting and strength characteristics than corresponding polyamine-free inks which were similarly made except for the presence of the polyamine component.

Example 13

83 parts by weight of polymerized wood rosin, 183 parts by weight of dehydrated castor oil and 1450 parts by weight of aged linseed oil were mixed, and then heated with agitation at 295–300° C. until the viscosity of the reaction mass was approximately 20 poises at 25° C. The reaction was then checked by the addition of 534 parts of the wood rosin. It was cooled to 100° C. and 22.5 parts by weight of tetra-ethylene-pentamine was mixed therein.

Several inks were prepared by mixing usual colors in the above product as a vehicle (including milori blue, resinated calcium lithol, and monastrol blue). Each of these showed better pigment wetting characteristics than did corresponding polyamine-free inks which were prepared similarly except for the presence of the polyamine component. The body and flow characteristics of the former were also better than those of the latter. Printed sheets made therefrom showed cleaner print, less bronze, and higher gloss characteristics for the former than for the latter.

Example 14

20 parts by weight of ester gum, 20 parts by weight of a partial glyceride of a rosin-maleic anhydride adduct (described in Example 11) and 40 parts by weight of isopropyl acetate were mixed; then 0.8 parts by weight of tri-ethylene-tetramine was mixed therein. The resulting varnish was an excellent rotogravure ink vehicle.

Several rotogravure inks were prepared by mixing usual pigments in the above vehicle. Each of these showed better pigment wetting characteristics than did corresponding polyamine-free which were prepared similarly except for the presence of the polyamine. Similar improvements were observed in the body, flow and print characteristics of the polyamine salt inks.

Example 15

500 parts by weight of a partial glyceride of the adduct of rosin and maleic anhydride obtainable by reacting the acidic resin described in Example 7 with sufficient glycerol to give a reaction product having an acid value of 30 was dissolved in 450 parts by weight of isopropyl acetate. When the resin was completely in solution, there was added 10 parts by weight of commercial heptaethanol tetraethylene pentamine. The resulting vehicle, especially adapted for rotogravure inks, was found to have exceptionally good pigment wetting properties and the pigment dispersions in this vehicle showed very good flow properties.

Example 16

500 parts by weight of a rosin modified phenolic resin, described in Example 10, were mixed in 550 parts by weight of a mineral oil fraction boiling in the range of 265° to 300° C. 8.2 parts by weight of commercial N-lauryl tetraethylene pentamine were added to the resin solution and stirred in. This vehicle, especially adapted for heat set types of printing inks, was found to possess good pigment wetting properties and to give color dispersions of good flow.

Although a number of examples of compounding resinous compositions according to the invention have been given herein, it is to be understood that the invention is not limited thereto or thereby, but is susceptible of changes in form and detail within the scope of the appended claims.

The term "composition consisting essentially of" appearing in the following claims is not limited to compositions consisting exclusively of the specified essential ingredients, but includes those containing other added ingredients which do not defeat the purpose of the invention, in accordance with the disclosure

I claim:

1. A composition consisting essentially of a substantially amide-free polyamine salt of an acidic resin selected from the group consisting of acidic synthetic and acidic modified neutral resins in a polyglycol.

2. A composition consisting essentially of a substantially amide-free polyamine salt of an acidic resin selected from the group consisting of acidic synthetic and acidic modified neutral resins in a polyethylene glycol.

3. A composition consisting essentially of a substantially amide-free polyamine salt of an acidic resin selected from the group consisting of acidic synthetic and acidic modified neutral resins in a diethylene glycol.

4. A composition consisting essentially of a pigment and a substantially amide-free polyethylene polyamine salt of an acidic alkyd resin soluble in a glycol solvent.

5. A composition consisting essentially of a pigment and a substantially amide-free polyethylene polyamine salt of a rosin-ethylene dicarboxylic acid derivative adduct soluble in a glycol solvent.

6. A composition consisting essentially of a pigment and a substantially amide-free polyethylene polyamine salt of a terpene ethylene dicarboxylic acid derivative adduct soluble in a glycol solvent.

7. A composition consisting essentially of a pigment and a substantially amide-free polyethylene polyamine salt of an acidic alkyd resin soluble in a polyethylene glycol.

8. A composition consisting essentially of a pigment and a substantially amide-free polyamine salt of a rosin-ethylene dicarboxylic acid derivative adduct soluble in a polyethylene glycol.

9. A composition consisting essentially of a pigment and a substantially amide-free polyethylene polyamine salt of a terpene ethylene dicarboxylic acid derivative adduct soluble in a polyethylene glycol.

10. A composition consisting essentially of a pigment and a substantially amide-free polyethylene polyamine salt of an acidic alkyd resin soluble in diethylene glycol.

11. A composition consisting essentially of a pigment and a substantially amide-free polyethylene polyamine salt of a rosin-ethylene dicarboxylic acid derivative adduct soluble in diethylene glycol.

12. A composition consisting essentially of a pigment and a substantially amide-free polyethylene polyamine salt of a terpene ethylene dicarboxylic acid derivative adduct soluble in diethylene glycol.

13. The method of stabilizing a printing ink vehicle composed essentially of a solution of an acidic resin in a solvent therefor, which consists in treating the solution with a polyamine capable of at least partially converting said acidic resin in solution into a polyamine salt of said resin, whereby a polyamine salt of the acidic resin is formed therein.

14. The method of stabilizing a printing ink vehicle composed essentially of a dispersion of an acidic resin in a drying oil, which consists in treating said vehicle with a polyamine capable of at least partially converting said acidic resin into a polyamine salt of said resin, whereby a polyamine salt of the acidic resin is formed therein.

15. The method of stabilizing a printing ink composed essentially of a pigment dispersed in a solution of an acidic resin in a solvent therefor which consists in treating the ink with a polyamine capable of at least partially converting said acidic resin into a polyamine salt of said resin, whereby a polyamine salt of the acidic resin is formed therein.

16. The method of stabilizing a printing ink composed essentially of a pigment mixed in a dispersion of an acidic resin in a drying oil, which consists in treating the ink with a polyamine capable of at least partially converting said acidic resin into a polyamine salt of said resin, whereby a polyamine salt of the acidic resin is formed therein.

FREDERICK EDWARD PETKE.

REFERENCES CITED

The following references are of record in the file of this patent:

UNITED STATES PATENTS

| Number | Name | Date |
| --- | --- | --- |
| 2,111,802 | Oswald | Mar. 22, 1938 |
| 2,304,369 | Morgan et al. | Dec. 8, 1942 |
| 2,309,088 | Auer | Jan. 26, 1943 |
| 2,312,732 | Salathiel | Mar. 2, 1943 |
| 2,356,025 | Bergamini | Aug. 15, 1944 |
| 2,371,212 | Bassford et al. | Mar. 13, 1945 |
| 2,382,838 | Weber | Aug. 14, 1945 |
| 2,387,049 | Bassford | Oct. 16, 1945 |

OTHER REFERENCES

"Glycerol and the Glycols," by Lawrie (1928), pages 381–385 inclusive.